United States Patent [19]
Irie et al.

[11] Patent Number: 6,019,863
[45] Date of Patent: Feb. 1, 2000

[54] OPTICAL DISK STRUCTURE, METHOD OF MANUFACTURING THE SAME, AND APPARATUS FOR MANUFACTURING THE SAME

[75] Inventors: Hideyuki Irie; Takeshi Hagio, both of Yokohama; Minami Amano, Ageo; Mikio Mori, Kamakura; Takashi Tomita, Mishima; Keiji Kakinuma, Gotenba, all of Japan

[73] Assignees: Kabushiki Kaisha Toshiba, Kawasaki; Toshiba-Emi Limited, Tokyo, both of Japan

[21] Appl. No.: 08/941,019

[22] Filed: Sep. 30, 1997

Related U.S. Application Data

[62] Division of application No. 08/616,879, Mar. 15, 1996, abandoned.

[30] Foreign Application Priority Data

Mar. 16, 1995 [JP] Japan .................................. 7-057248
Mar. 16, 1995 [JP] Japan .................................. 7-057627
Mar. 16, 1995 [JP] Japan .................................. 7-057628

[51] Int. Cl.⁷ .................................................... B32B 31/04
[52] U.S. Cl. .......................... 156/182; 156/277; 156/292; 156/580; 156/581; 369/286
[58] Field of Search ..................... 156/182, 580, 156/381, 556, 384, 292, 277, 581; 369/286, 275.5

[56] References Cited

U.S. PATENT DOCUMENTS 4,972,404  11/1990  Yamaguchi .
5,146,438   9/1992  Harper ................................ 369/286 X
5,284,538   2/1994  Suzuki et al. ...................... 156/292 X
5,346,654   9/1994  Kodaka .
5,582,677  12/1996  Miwa et al. ....................... 156/580 X

FOREIGN PATENT DOCUMENTS 0 408 763   1/1991  European Pat. Off. .
0 443 797   8/1991  European Pat. Off. .
0 488 388   6/1992  European Pat. Off. .
0 567 080  10/1993  European Pat. Off. .
57-143701   9/1982  Japan .
1-296444   11/1989  Japan .
3-144939    6/1991  Japan .
5-054 599   3/1993  Japan .
WO 85/03376 1/1985  WIPO .

*Primary Examiner*—Curtis Mayes
*Attorney, Agent, or Firm*—Pillsbury Madison & Sutro LLP

[57] ABSTRACT

Indication members provided around a central hole in a disk does not adversely affect reference surfaces to be clamped, and clear, stable indication is maintained. For this purpose, first and second optical disks having annular light transmissive disk substrates with a common central hole, one surface of each of which light transmissive disk substrates is provided with a reflection film, are attached to each other as one body with an adhesive layer interposed therebetween, such that the reflection films opposed each other, thereby forming a compound optical disk. Label members are provided from the reflection film side by printing or attachment on flat portions surrounding the central hole.

5 Claims, 9 Drawing Sheets

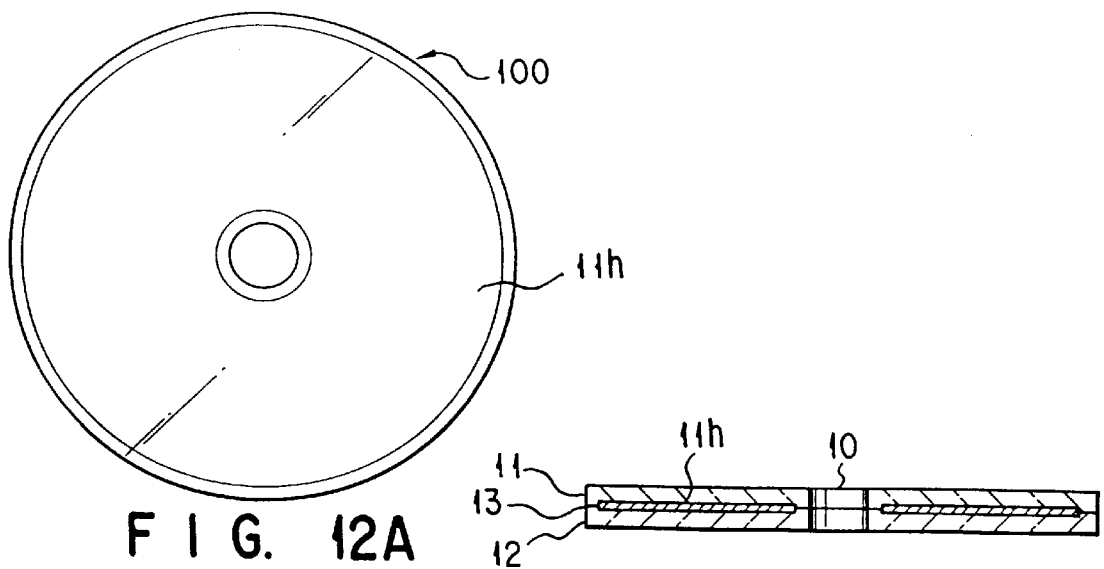
FIG. 12A
FIG. 12B
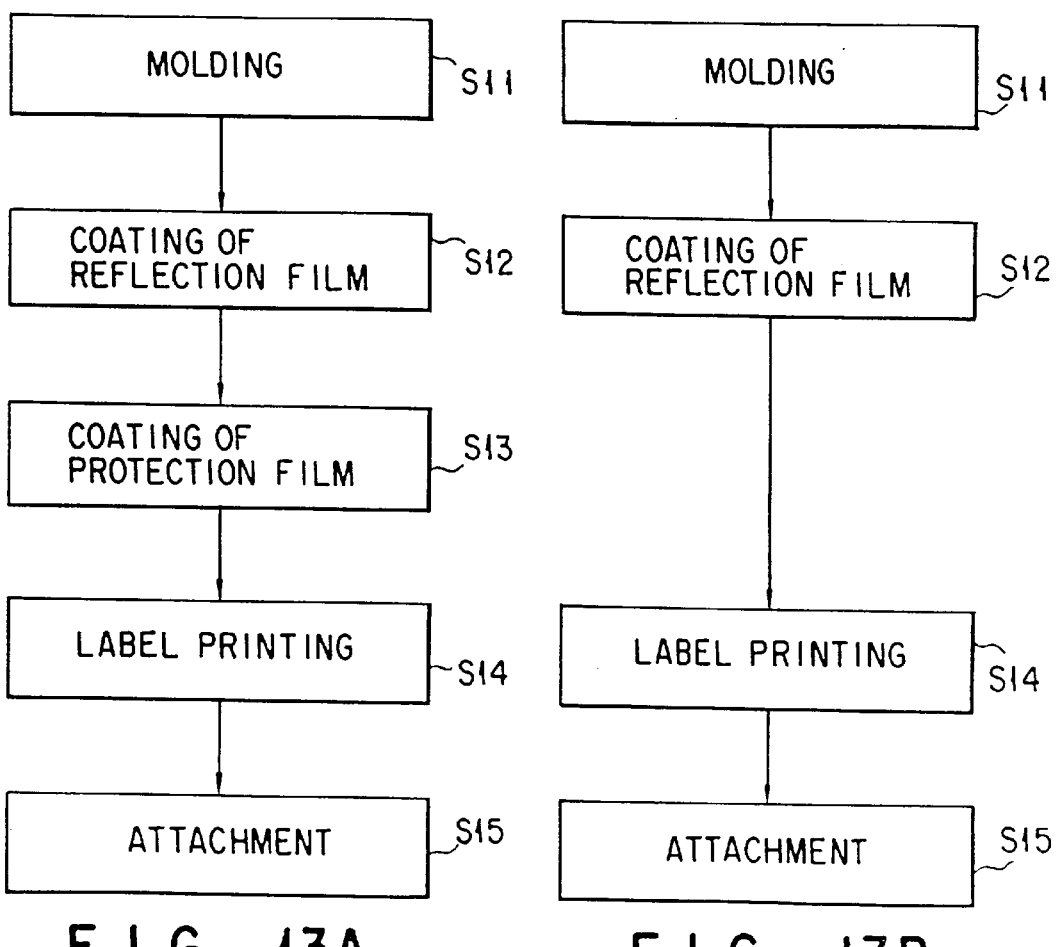
FIG. 13A
FIG. 13B

| PRINTED REGION | | RANGE | r = 30 mm VALUE | | r = 50 mm | | NOTES |
|---|---|---|---|---|---|---|---|
| NO PRINTING | | 0.27° | -0.24 ~ 0.01 | | | -0.06 ~ 0.01 | |
| INNER SURFACE PRINTING (AVERAGE) | | 0.28 | -0.22 ~ 0.05 | 0.29 | | -0.05 ~ 0.23 | |
| DETAILS | ① | 0.28 | -0.19 ~ 0.09 | 0.29 | | -0.04 ~ 0.24 | THICKNESS OF PRINT: ABOUT 50μm |
| | ② | 0.29 | -0.26 ~ 0.03 | 0.29 | | -0.07 ~ 0.21 | SAME |
| | ③ | 0.28 | -0.22 ~ 0.04 | 0.30 | | -0.05 ~ 0.25 | SAME |
| OUTER SURFACE PRINTING | ① | 0.52 | -0.45 ~ 0.07 | 0.57 | | -0.53 ~ 0.04 | THICKNESS OF PRINT: ABOUT 50μm |
| | ② | 0.67 | -0.40 ~ 0.27 | 0.56 | | -0.21 ~ 0.35 | SAME |
| | ③ | 0.79 | -0.37 ~ 0.41 | 0.76 | | -0.20 ~ 0.56 | SAME |
| | ④ | 1.21 | -0.92 ~ 0.29 | 1.17 | | -0.89 ~ 0.28 | THICKNESS OF PRINT: ABOUT 100μm |
| (ATTACHMENT OF SEAL) | ⑤ | 0.56 | -0.28 ~ 0.28 | 0.67 | | -0.17 ~ 0.49 | ATTACHMENT OF TAPE |

FIG. 15

OPTICAL DISK STRUCTURE, METHOD OF MANUFACTURING THE SAME, AND APPARATUS FOR MANUFACTURING THE SAME

This is a division of application Ser. No. 08/616,879, filed Mar. 15, 1996 now abandoned.

BACKGROUND OF THE INVENTION

1. Field of the Invention

The present invention relates generally to a recording medium for use in recording/reproducing audio information, video information or ordinary data, and more particularly to an optical disk structure capable of recording/reproducing signals by means of light, a method of manufacturing the optical disk structure and an apparatus for manufacturing the optical disk structure.

2. Description of the Related Art

There is known an optical disk constructed so that recorded signals are reproduced by means of a laser beam. In an example of this type of optical disk, signal recording areas are provided on both sides of the disk.

Recently, a small-sized video disk (with a diameter of about 12 cm) for high-density recording has been developed. In the small-sized, high-density video disk, most of a flat portion of the disk extending from a central hole to a recording start region is used as a clamp zone (to be clamped and held by a disk holding mechanism). Thus, the flat portion functions as a reference surface of the disk in relation to the optical system when the disk is mounted on a turntable and clamped by a clamper.

If a conventional label is attached to this disk as an indication label, the following problems (a) and (b) will occur:

a) Because tilt (inclination) tolerance angle of the disk is to be very small, even if the disk is slightly inclined, the quality of a reproduced signal is greatly degraded. If the above-mentioned indication means is used, the disk tends to be easily inclined due to a sheet attached to the clamp zone or unevenness of printed ink, etc.

b) A sheet is attached, or ink, etc. is printed, on a limited area of the clamp zone of the disk. When the disk is mounted on the turntable and held by the clamper, the clamper may cause damage to the indication surface due to a slip which occurs, in particular, at the time of start of the operation. As a result, the indication may become unclear, the reference surface of the clamp zone may be inclined, or the indication label may be removed.

SUMMARY OF THE INVENTION

An object of the invention is to provide an optical disk structure wherein an indication label provided on flat surfaces surrounding a central hole in a disk can maintain a clear, stable indication state, a method of manufacturing the optical disk structure, and an apparatus for manufacturing the same.

Another object of the invention is to provide an optical disk structure wherein the clear, stable indication state can be maintained and, even if the indication label is provided, reference surfaces to be clamped are not adversely affected, a method of manufacturing the optical disk structure, and an apparatus for manufacturing the same.

In order to achieve the objects, there is provided an optical disk structure in which first and second optical disks having annular light transmissive disk substrates with a common central hole, and wherein at least one surface of the light transmissive disk substrates is provided with a reflection film, are attached to each other as one body with an adhesive layer interposed therebetween, such that the reflection film is opposed to the adhesive layer, thereby forming a compound optical disk, the optical disk structure comprising:

an inner surface of a portion of at least one of the light transmissive disk substrates, the portion facing a clamper and being located around the central hole;

an indication label provided on the inner surface by means of one of printing and attachment; and the adhesive layer with light shielding properties, provided between the indication label and the other of the light transmissive disk substrates.

According to this means, the printed or attached indication label is located inside the disk. Thus, the indication label is not removed or damaged by friction, etc. between the disk and a clamper or a turntable, and clear indication is maintained. In particular, because the adhesive layer provided in the region of the indication label has light shield properties, the indicated matter does not become less visible due to light from the back side.

According to this invention, there is also provided an optical disk structure in which first and second optical disks having annular light transmissive disk substrates with a common central hole, and wherein at least one surface of the light transmissive disk substrates is provided with a reflection film, are attached to each other as one body with an adhesive layer interposed therebetween, such that the reflection film is opposed to the adhesive layer, thereby forming a compound optical disk, the optical disk structure comprising:

a recess portion recessed in a thickness direction in a portion of at least one of the light transmissive disk substrates around the central hole; and an indication label provided on a bottom surface of the recess portion by means of one of printing and attachment.

According to this invention, the printed or attached the indication label is provided from the reflection film side between the attached disks. Thus, even if the flat portions surrounding the central hole are used as clamp zones functioning as reference surfaces, an influence of the indication label does not occur. The indication label is not removed or damaged by friction, etc. between the disk and a clamper or a turntable, and clear indication is maintained. In particular, the indication label is printed or attached to the bottom of the recess portion. Thus, even if there is a variance in thickness in printed matter or sheet, the variance does not deform the clamp zones.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying figures, which are incorporated in and constitute a part of the specification, illustrate presently preferred embodiments of the invention and, together with the general description given above and the detailed description of the preferred embodiments given below, serve to explain the principles of the invention.

FIG. 12A is a plan view of a compound optical disk according to another embodiment of the invention;

FIG. 12B is a cross-sectional view of the compound optical disk shown in FIG. 12A;

FIG. 13A illustrates steps of a method of manufacturing a compound optical disk, according to an embodiment of the invention;

FIG. 13B illustrates steps of a method of manufacturing a compound optical disk, according to another embodiment of the invention;

FIG. 15 illustrates advantages of the compound optical disks of the present invention;

DETAILED DESCRIPTION OF THE PREFERRED EMBODIMENTS

Embodiments of the present invention will now be described with reference to the accompanying figures.

Figure 1A:
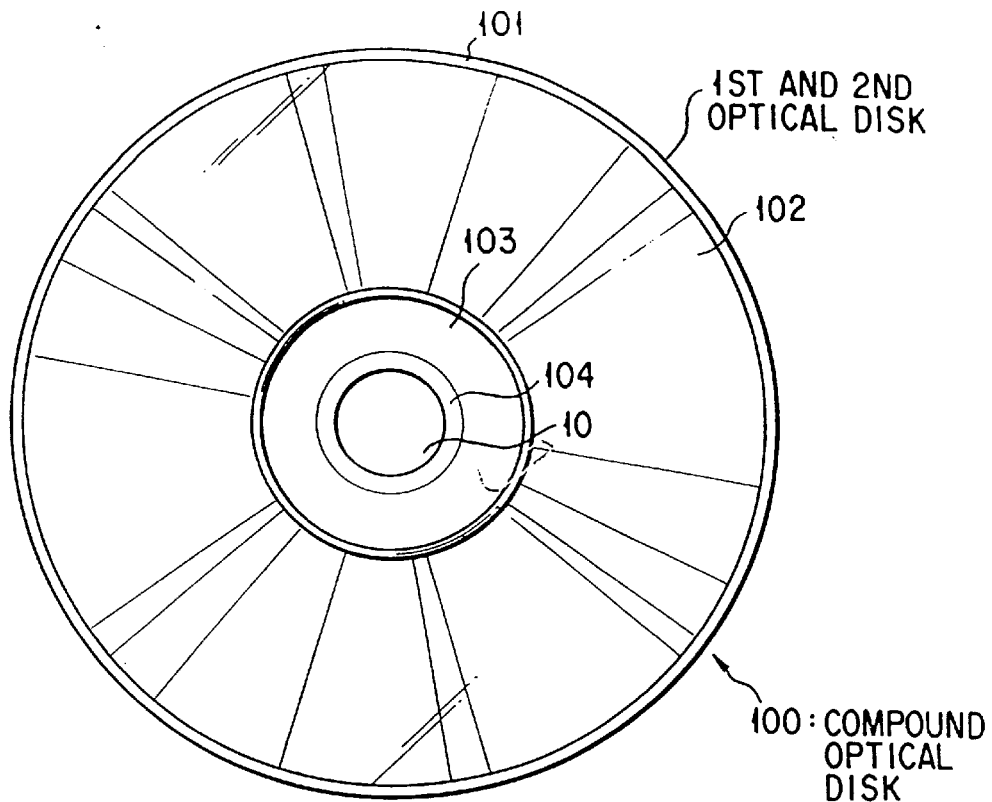
FIG. 1A is a plan view of a compound optical disk according to an embodiment of the present invention.
Figure 1B:
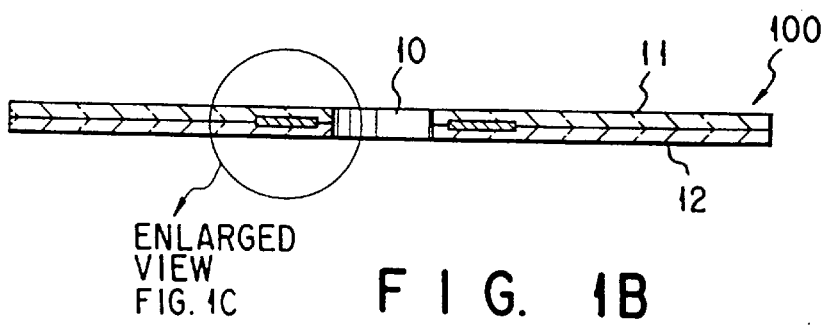
FIG. 1B is a cross-sectional view of the compound optical disk shown in FIG. 1A.
Figure 1C:
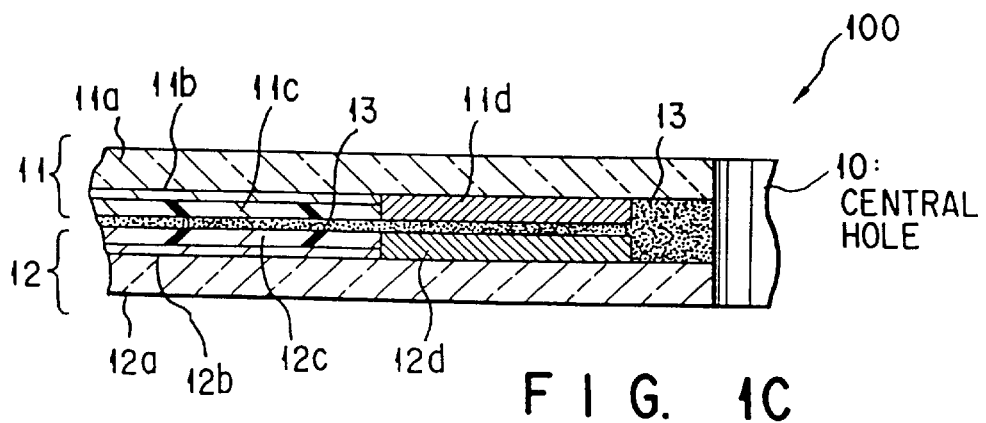
FIG. 1C is a partially enlarged view of the compound optical disk shown in FIG. 1B.

FIGS. 1A to 1D show an embodiment of the present invention. FIG. 1A is a plan view, FIG. 1B is a cross-sectional view and FIG. 1C is a partially enlarged view. First and second optical disks 11 and 12 have a common central hole 10 of the same diameter. The first and second optical disks 11 and 12 include annular light transmissive disk substrates 11a and 12a, respectively. One surface of the disk substrate 11a and one surface of the disk substrate 12a have reflection films 11b and 12b. Protection films 11c and 12c are provided on surfaces of the reflection films 11b and 12b. The first and second optical disks 11 and 12 are attached to each other as one body with an adhesive layer 13 interposed therebetween, such that their reflection films 11b and 12b opposed each other. Thus, the first and second optical disks 11 and 12 constitute a compound optical disk 100.

FIG. 1A shows the external appearance of the compound optical disk 100. The disk 100 includes, from the outer peripheral side to the inner peripheral side, a non-signal region 101, a signal recording region 102, a clamp region 103, an edge portion 104, and the central hole 10. In the case of this compound optical disk 100, the clamp region 103 functions also as indication section. The indication section is constituted such that indication members 11d and 12d are provided on the inside of the regions of the light transmissive disk substrates 11a and 12a which correspond to the clamp region 103. The indication members 11d and 12d show characters, figures, signs, etc. that can be recognized from the outside surfaces of the compound optical disk 100.

The materials and dimensions of the respective elements of the compound optical disk 100 will now be described.

The light transmissive disk substrates 11a and 12a are formed of, e.g. polycarbonate, acrylic resin, or glass material. The adhesive layer 13 is formed of hot melt (e.g. PPET2009 manufactured by TOA GOSEI KAGAKU KOGYO) with a thickness of about 10 to 30 $\mu$m. The optical reflection films 11b and 12b are formed of aluminum, etc. with a thickness of about 0.1 $\mu$m. The protection films 11c and 12c are formed of, e.g. ultraviolet-curing coating material (e.g. SK500 manufactured by SONY CHEMICAL) with a thickness of about 5 to 15 $\mu$m. Preferably, the adhesive layer 13 has moisture-proof properties.

The indication members 11d and 12d are formed by attaching labels printed on sheets or by effecting direct printing on the disk substrates. Alternatively, the indication members 11d and 12d can be formed by means of coating or cutting.

The adhesive provided between the indication members 11d and 12d has light shield properties. If the adhesive passes light, the characters or figures on the indication members become less visible.

According to the above-described disk, an indication label formed by printing or attaching sheets are located inside the disk. Thus, the indication label is not removed or damaged by friction, etc. between the disk and a clamper or a turntable, and clear indication is maintained. In particular, since the adhesive layer provided in the region of the indication label has light shield properties, the indicated matter does not become less visible due to light from the back side. Therefore, characters or figures indicated by the indication members are clearly viewed.

Figure 1D:
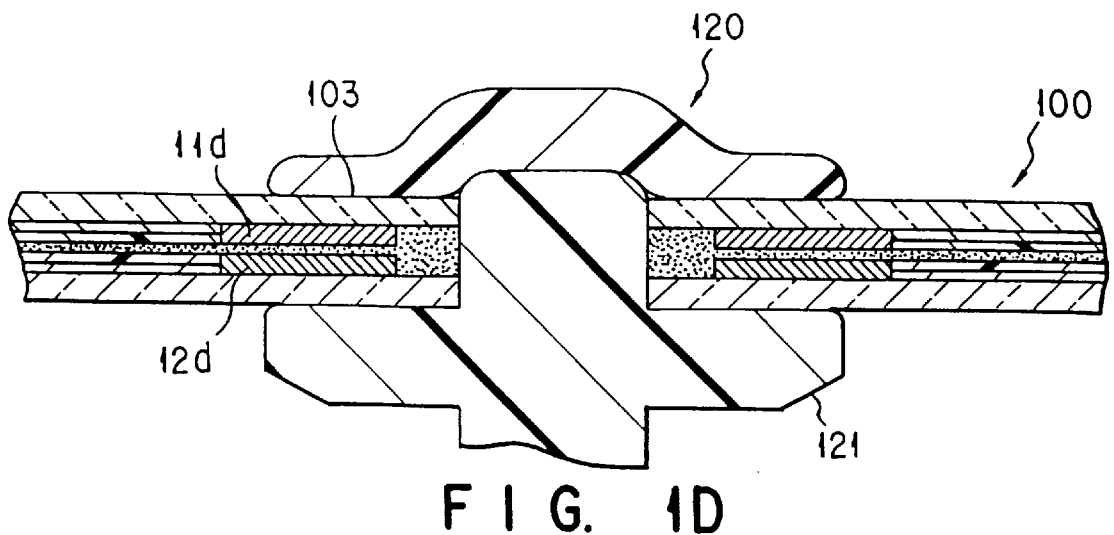
FIG. 1D shows a relationship between the compound optical disk and a clamper.

FIG. 1D shows the state in which the compound optical disk 100 is mounted on a turntable 121 and the clamp region of the disk is held by a clamper 120.

The following consideration should be given in providing the indication members 11d and 12d. When the indication members 11d and 12d are printed, if offset printing is adopted, the thickness of each indication member can be limited to about 15 μm even in the case of multi-color printing. However, if silk printing is adopted and the number of colors is increased, the thickness becomes 40 to 50 μm or more.

Figure 2:
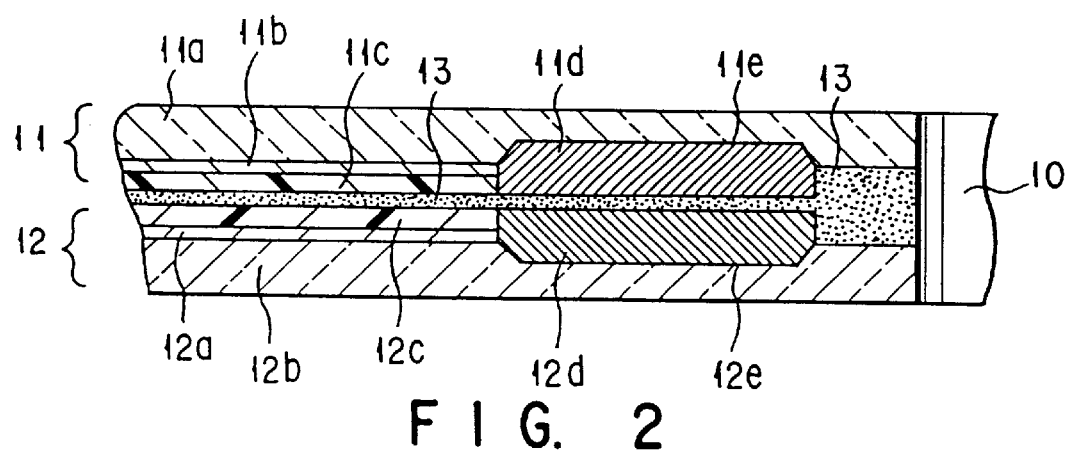
FIG. 2 is a cross-sectional view showing a main part of a compound optical disk according to another embodiment of the invention.
Figure 3:
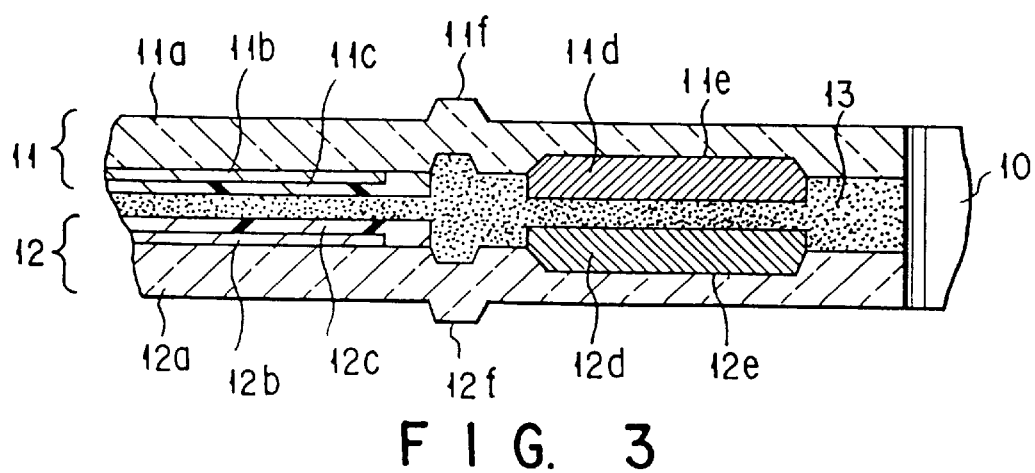
FIG. 3 is a cross-sectional view showing a main part of a compound optical disk according to still another embodiment of the invention.

To solve the above problem, recess portions 11e and 12e may be formed in the light transmissive disk substrates 11a and 12a from the back side as indication member forming portions, and the indication members 11d and 12d may be embedded in the recess portions 11e and 12e, as shown in FIGS. 2 and 3. Thereby, printing with greater thickness can easily be performed and a high indication effect can be exhibited.

In many cases, a boundary portion between a stamper (for forming signal pits during manufacture) and a stamper holder is provided at a position between a clamp zone and a beginning portion of a signal recording region. At the same time, annular projections 11f and 12f are provided at the boundary portion. The annular projections 11f and 12f are formed to protect signal surfaces when manufactured disks are stacked.

When the disk with the annular projections 11f and 12f is formed, the disk substrates 11a and 12a are formed by using a mold having a projection on the side corresponding to the inner surface of each substrate. Thus, the recess portions 11e and 12e can be easily formed simultaneously with the formation of the annular projections 11f and 12f, without providing special manufacturing steps.

Figure 4:
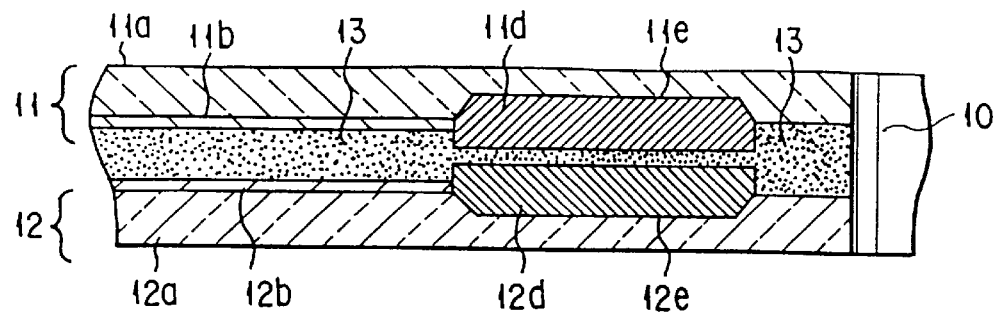
FIG. 4 is a cross-sectional view showing a main part of a compound optical disk according to still another embodiment of the invention.
Figure 5:
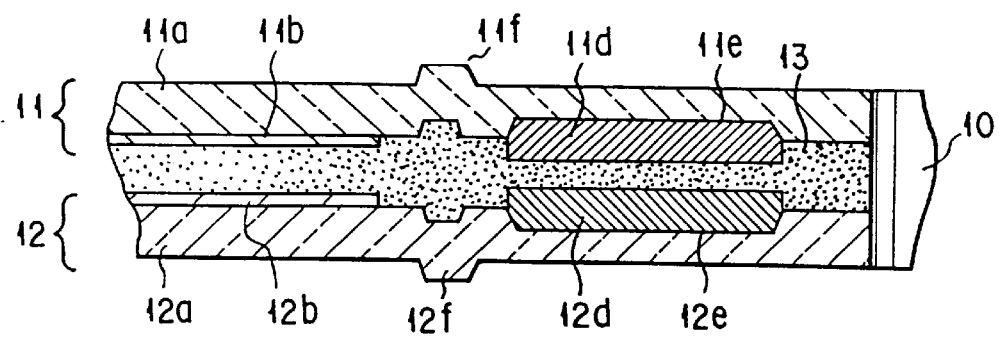
FIG. 5 is a cross-sectional view showing a main part of a compound optical disk according to still another embodiment of the invention.

In the above embodiments, the first and second disks 11 and 12 have protection films 11c and 12c. In the case of the compound optical disk 100 of this invention, the first and second disks 11 and 12 are formed as one body with the adhesive layer 13 interposed, therebetween such that their reflection films 11b and 12b oppose each other. Thus, as shown in FIGS. 4 and 5, the protection films 11c and 12c may be omitted. Consequently, the steps of manufacturing the protection films 11c and 12c may be omitted. In the embodiments of FIGS. 4 and 5, the protection films in the embodiments of FIGS. 2 and 3 are omitted. In each embodiment, common parts are indicated by like reference numerals and a description thereof is omitted.

According to the optical disk of this invention, a label is provided by printing or attachment of sheets on the reflection film side between the mutually attached disks. Accordingly, even if the outer surfaces of the optical disk are used as clamp zones serving as reference surfaces, there is no influence on the label. The label is not removed or damaged by friction, etc. between the disk and the clamper or turntable so that a clear indication by the label can be maintained.

Indicated matter of the indication section includes, for example, an identification mark of "side A" and "side B", the title of recorded information (e.g. characters of the title, figures), the name of a manufacturer, the manufacturing number, etc.

Figure 6:
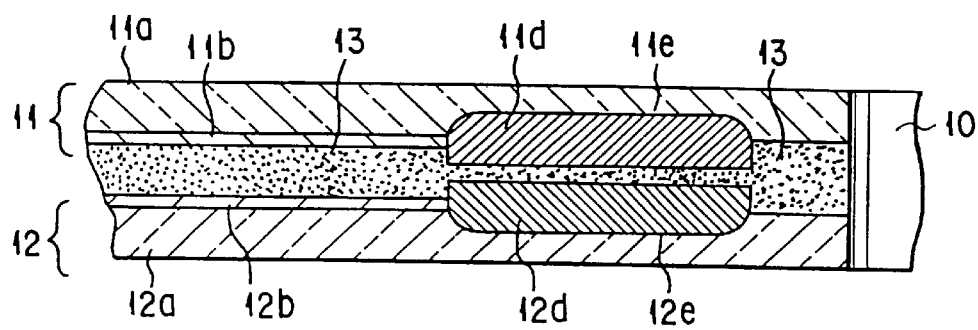
FIG. 6 is a cross-sectional view showing a main part of a compound optical disk according to still another embodiment of the invention.
Figure 7:
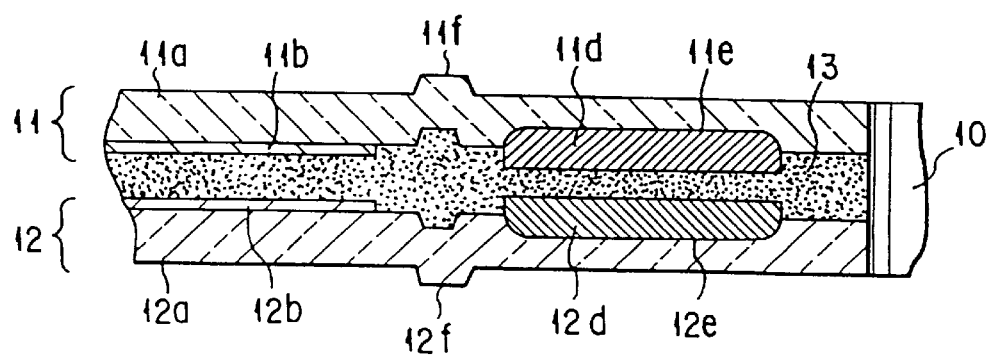
FIG. 7 is a cross-sectional view showing a main part of a compound optical disk according to still another embodiment of the invention.

In FIGS. 2 to 5, the edges of the recess portions 11e and 12e are sharply defined. However, as shown in FIGS. 6 and 7, the edges of the recess portions 11e and 12e may be curved.

The present invention is not limited to the above embodiments.

Figure 8A:
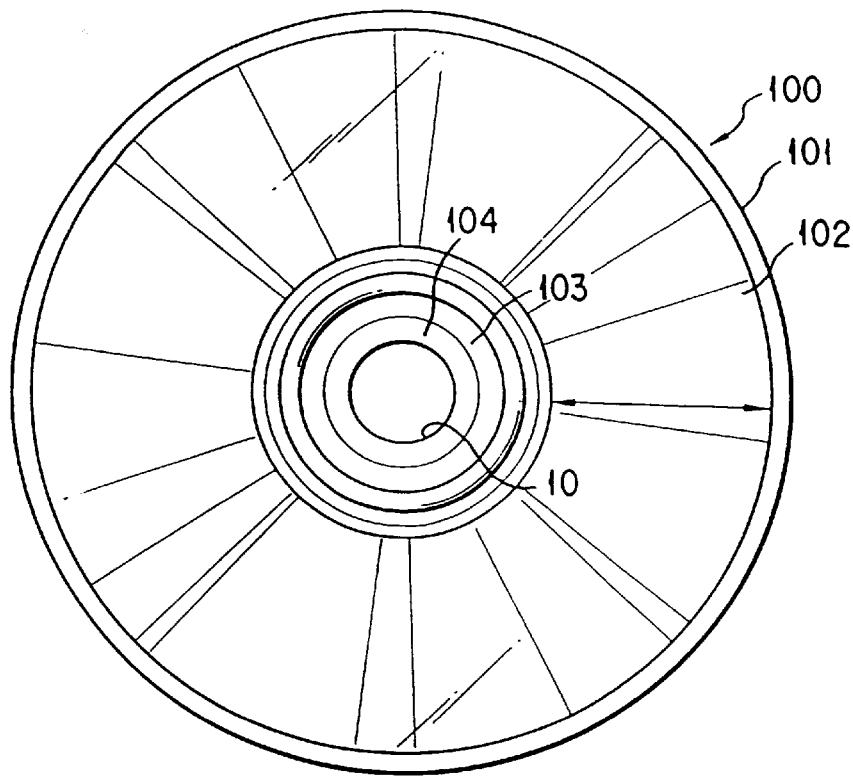
FIG. 8A is a plan view of a compound optical disk according to another embodiment of the invention.
Figure 8B:
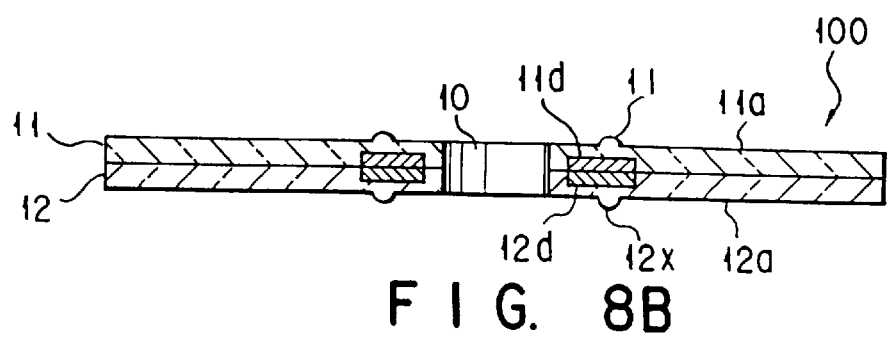
FIG. 8B is a cross-sectional view of the compound optical disk shown in FIG. 8A.
Figure 8C:
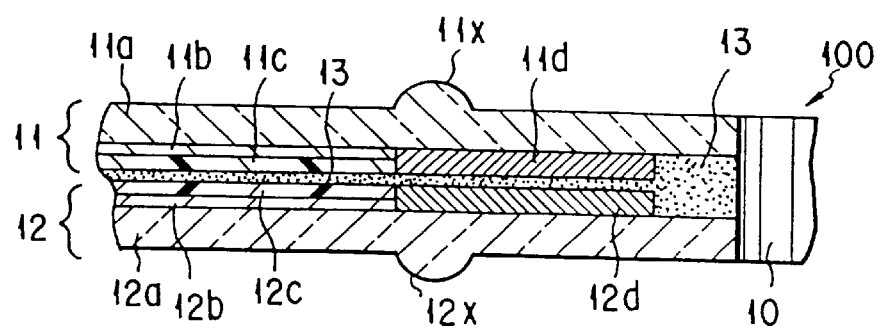
FIG. 8C is a partially enlarged view of the compound optical disk shown in FIG. 8B.

FIG. 8A is a plan view, FIG. 8B is a cross-sectional view and FIG. 8C is a partially enlarged view. First and second optical disks 11 and 12 have a common central hole 10 of the same diameter. The first and second optical disks 11 and 12 include annular light transmissive disk substrates 11a and 12a, respectively. One surface of the disk substrate 11a and one surface of the disk substrate 12a has a reflection film 11b and 12b, respectively, provided thereon. Protection films 11c and 12c are provided on respective surfaces of the reflection films 11b and 12b. The first and second optical disks 11 and 12 are attached to each other as one body with an adhesive layer 13 interposed, therebetween such that their reflection films 11b and 12b oppose each other. Thus, the first and second optical disks 11 and 12 constitute a compound optical disk 100.

FIG. 8A shows the external appearance of the compound optical disk 100. The disk 100 includes, from the outer peripheral side to the inner peripheral side, a non-signal region 101, a signal recording region 102, a clamp region 103, an edge portion 104, and the central hole 10. In the case of this compound optical disk 100, the clamp region 103 functions also as indication section. The indication section is constituted such that indication members 11d and 12d are provided on the inside of the regions of the light transmissive disk substrates 11a and 12a which correspond to the clamp region 103. The indication members 11d and 12d show, for example, characters, figures, signs, etc., that can be recognized from the outside surfaces of the compound optical disk 100.

In this disk, annularly projecting lens portions 11x and 12x are formed on portions of the outer surfaces of the clamp region 103 so that indicated matter on the indication members 11d and 12d can be viewed in an enlarged manner.

The materials and dimensions of the respective elements of the compound optical disk 100 are the same as those in the preceding embodiments.

The following consideration should be given in providing the indication members 11d and 12d. When the indication members 11d and 12d are printed, if offset printing is adopted, the thickness of each indication member can be limited to about 15 μm even in the case of multi-color printing. However, if generally used silk printing is adopted and the number of colors is increased, the thickness becomes 40 to 50 μm or more.

Figure 9:
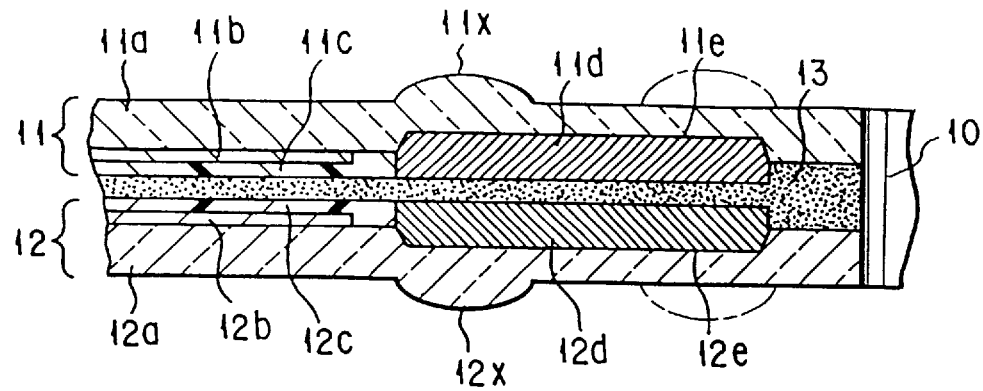
FIG. 9 is a cross-sectional view showing a main part of a compound optical disk according to another embodiment of the invention.
Figure 10:
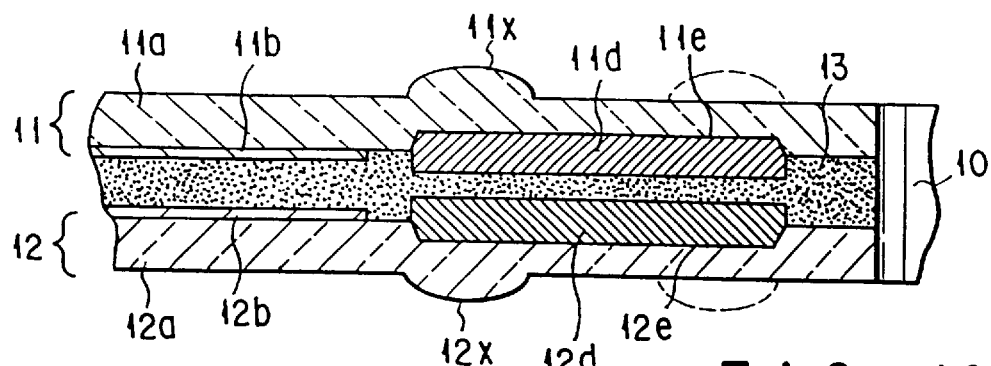
FIG. 10 is a cross-sectional view showing a main part of a compound optical disk according to still another embodiment of the invention.

To solve the above problem, recess portions 11e and 12e may be formed in the light transmissive disk substrates 11a and 12a from the back side as indication member forming portions, and the indication members 11d and 12d may be embedded in the recess portions 11e and 12e, as shown in FIGS. 9 and 10. Thereby, printing with greater thickness can easily be performed and a high indication effect can be exhibited.

In many cases, a boundary portion between a stamper (for forming signal pits during manufacture) and a stamper holder is provided at a position between a clamp zone and a beginning portion of a signal recording region. At the same time, annular projections are provided at the boundary portion. The annular projections are formed to protect signal surfaces when manufactured disks are stacked. When the disk with the annular projections is formed, the disk substrates 11a and 12a are formed by using a mold having a projection on the side corresponding to the inner surface of each substrate. Thus, the recess portions 11e and 12e can be easily formed simultaneously with the formation of the annular projections, without providing special manufacturing steps. In addition, if the annular projections are formed to serve also as lens portions 11x and 12x, there is no need to add steps for forming the lens portions 11x and 12x.

The present invention is not limited to the above embodiments and various modifications can be made. In the above embodiments (FIGS. 8C and 9), the first and second disks 11 and 12 have protection films 11c and 12c. In the case of the compound optical disk 100 of this invention, the first and second disks 11 and 12 are formed as one body with the adhesive layer 13 interposed, therebetween such that their reflection films 11b and 12b are opposed to each other. Thus, as shown in FIG. 10, the protection films 11c and 12c may be omitted. Thereby, the steps of manufacturing the protection films 11c and 12c may be omitted.

In the above embodiments, the outer surface portions of the indication area are used as a clamp region, the lens portions 11x and 12x are formed on the outer peripheral side of the indication area. However, needless to say, the lens portions 11x and 12x may be formed on the inner peripheral side, for example, as indicated by dotted lines in FIGS. 9 and 10. The positions and number of lens portions may be freely chosen in accordance with the desired indication. It is possible, therefore, that a plurality of lens portions are formed on the outer surface side of the indication and on the inner and outer peripheral sides of the indication and the regions between the lens portions are used as clamp regions for holding the disk. If such clamp regions are used, the clamper is automatically situated between the lens portions, and the disk can be advantageously positioned in a reproducing apparatus. In each embodiment, common parts are indicated by like reference numerals and a description thereof is omitted.

According to the optical disk of this invention, a label is provided by printing or attachment of sheets on the reflection film side between the mutually attached disks. Accordingly, even if the outer surfaces of the optical disk are used as clamp zones serving as reference surfaces, there is no adverse influence on the label. The label is not removed or damaged by friction, etc. between the disk and the clamper or turntable so that a clear indication of the label can be maintained. In particular, according to the disk of this invention, the indicated matter can be easily viewed from the outside by virtue of the lens portions 11x and 12x.

Figure 11A:
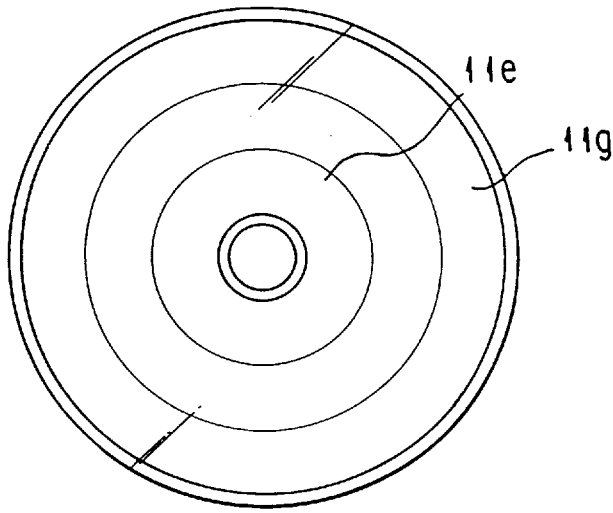
FIG. 11A is a plan view of a compound optical disk according to another embodiment of the invention.
Figure 11B:
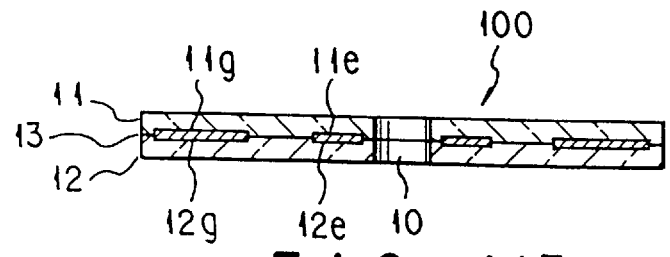
FIG. 11B is a cross-sectional view of the compound optical disk shown in FIG. 11A.

FIGS. 11A and 11B show still another embodiment of the optical disk of the invention.

FIG. 11A is a plan view and FIG. 11B is a cross-sectional view. In this embodiment, additional label means is provided on the outer peripheral side. In the preceding embodiments, the indication members 11d and 12d are provided on the inner peripheral side. However, indications members 11g and 12g may be provided on the outer peripheral side, too.

FIGS. 12A and 12B show still another embodiment of the optical disk of the invention.

FIG. 12A is a plan view and FIG. 12B is a cross-sectional view. In the case of the disk of this embodiment, information can be read out from one side only. Recording signals are recorded on the second disk 12 alone, and the first disk 11 comprises a transparent substrate alone. In this case, a large indication member 11h may be provided on the inner surface of the first disk 11.

A method of manufacturing the above-described optical disks will now be described.

FIG. 13A illustrates manufacturing steps of a method according to an embodiment of the invention, and FIG. 13B illustrates manufacturing steps of a method according to another embodiment of the invention.

A compound optical disk according to this invention comprises first and second optical disks. Each optical disk has an annular light transmissive disk substrate with a central hole. A reflection film is provided on one side of the disk substrate. The first and second optical disks are attached to each other as one body with an adhesive layer interposed, therebetween such that their reflection films are opposed to each other. An indication is printed or attached from the reflection film side in the region surrounding the central hole. The attachment step is performed after an indication providing step, e.g. a label printing step.

Specifically, in FIG. 13A, a mold (generally called "stamper") provided in advance with pits representing recording information is attached to a resin molding machine such as an injection molding machine. Then, a disk of a transparent plastic material such as polycarbonate or acrylic resin, on which pits of the stamper are exactly transferred, is obtained (step S11). A metal such as aluminum is deposited by sputtering or vacuum deposition on that surface of the disk, which is provided with the pits, thereby forming a reflection film (step S12). Subsequently, an ultraviolet-curing resin, etc. is coated by a spinner, etc. on the surface of the reflection surface, thereby forming a protection film for protecting the reflection surface against damage or oxidation (step S13). In this manner, the first and second disks are formed and labels are printed on predetermined areas (inside of the clamp regions) (step S14). After the printing, the disks are attached to each other (step S15). In the attachment step, a thermoplastic adhesive called "hot melt" is coated by a roll coater, etc. on the attachment surfaces of the disks. The attachment surfaces with the adhesives are abutted upon each other and pressed on each other under pressure, thus forming a single compound optical disk. In the embodiment shown in FIG. 13B, the step of forming the protection film is omitted.

In a method and apparatus for manufacturing the optical disk of the present invention, the following techniques are applicable, in particular, to the step of attaching two disks.

Figure 14A:
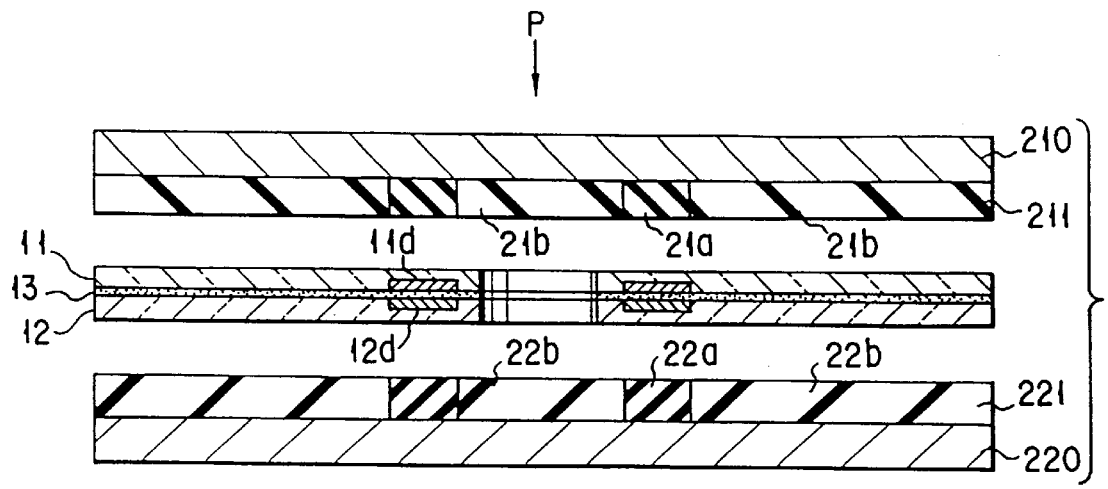
FIG. 14A shows an apparatus for manufacturing a compound optical disk according to an embodiment of the invention.

As shown in FIG. 14A, an attaching (pressing) apparatus comprises upper and lower disk-like pressing plates 210 and 220 having diameters substantially equal to or greater than those of the disks. Disk-like elastic members 211 and 221 for pressing the outer surfaces of the first and second disks are provided on the inner surfaces of the pressing plates 210 and 220. The first and second disks 11 and 12 sandwiching the adhesive layer 13 are transferred to the space between the elastic members 211 and 221. The lower pressing plate 220 is fixed on a support table (not shown), and the upper pressing plate 210 is attached to a vertical movement mechanism. The vertical movement mechanism gradually lowers to clamp the disk structure.

Portions 21a and 22a of the elastic members 211 and 221, which correspond to the indication members 11d and 12d of the disks, are formed of a material different from the material of the other portions 21b and 22b. Specifically, the portions corresponding to the indication members are formed of a relatively soft material such as silicone rubber (e.g. hardness: JISA40), and the other portions, excluding the indication members, are formed of a relatively hard material such as EP rubber (e.g. hardness: JISA65).

In this embodiment, the proper pressure in the attachment step was 2–3 kg/cm$^2$ and the proper pressing time was about 3 seconds, in the case of a 120 mm disk.

Figure 14B:
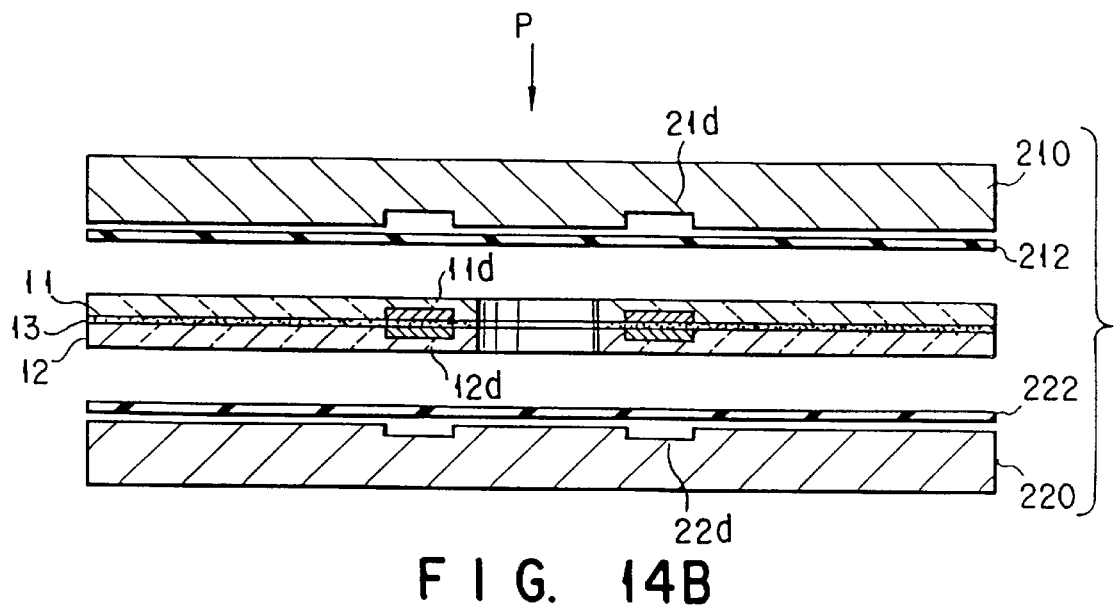
FIG. 14B shows an apparatus for manufacturing a compound optical disk according to another embodiment of the invention.

The pressing apparatus is not limited to the above, and the same advantages are obtainable with an apparatus shown in FIG. 14B.

In this embodiment, annular recess portions 21d and 22d (about 0.1 mm deep) are formed in those disk-side portions of the pressing plates 210 and 220, which correspond to the indication members. Elastic sheets (e.g. CIEGAL 7355-OFF 1.35 mm: manufactured by DAIICHI REISU) are interposed between the disks, on the one hand, and the pressing plates 210 and 220, on the other. In this state, the disk structure is pressed, as in the preceding embodiments. The same advantages as in the preceding embodiments are obtainable with this method and apparatus.

The pressing force on the indication members is made less than that on the other portions for the following reason. Printing is effected on the indication members by means of a screen printing method, or a stamping method. For example, if an ultraviolet-curing ink is used, the ink is cured by ultraviolet after printing. An adhesive such as hot melt is coated by means of a roll coater, etc. on the two disks. Those surfaces of the disks, which are coated with the adhesives, are abutted upon each other and pressed on each other. The thickness of the indication member increases by a degree corresponding to the thickness of the ink layer, resulting in unevenness due to characters, etc. printed in ink. If the disks are pressed by elastic members with uniformly high hardness, the unevenness appears on the outer surfaces of the indication members of the disks. As described above, in the case of small disks, the regions of the indication members serve as clamp regions. The clamp regions are used as reference surfaces and need to have a high degree of flatness. In the present invention, the structure of the elastic members or the structure of the pressing plates are devised so that the unevenness does not appear on the outer surfaces of the indication members.

Figure 16:
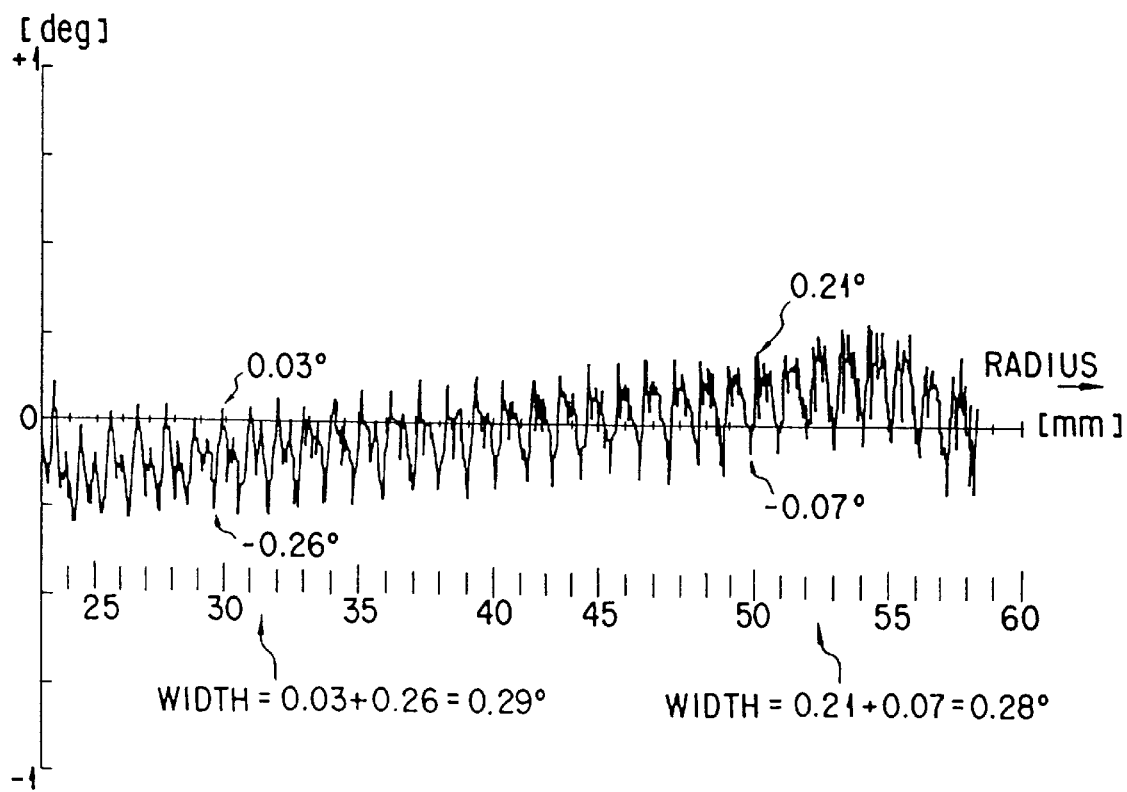
FIG. 16 is a graph showing measured tilt values for explaining the advantages of the invention.
Figure 17:
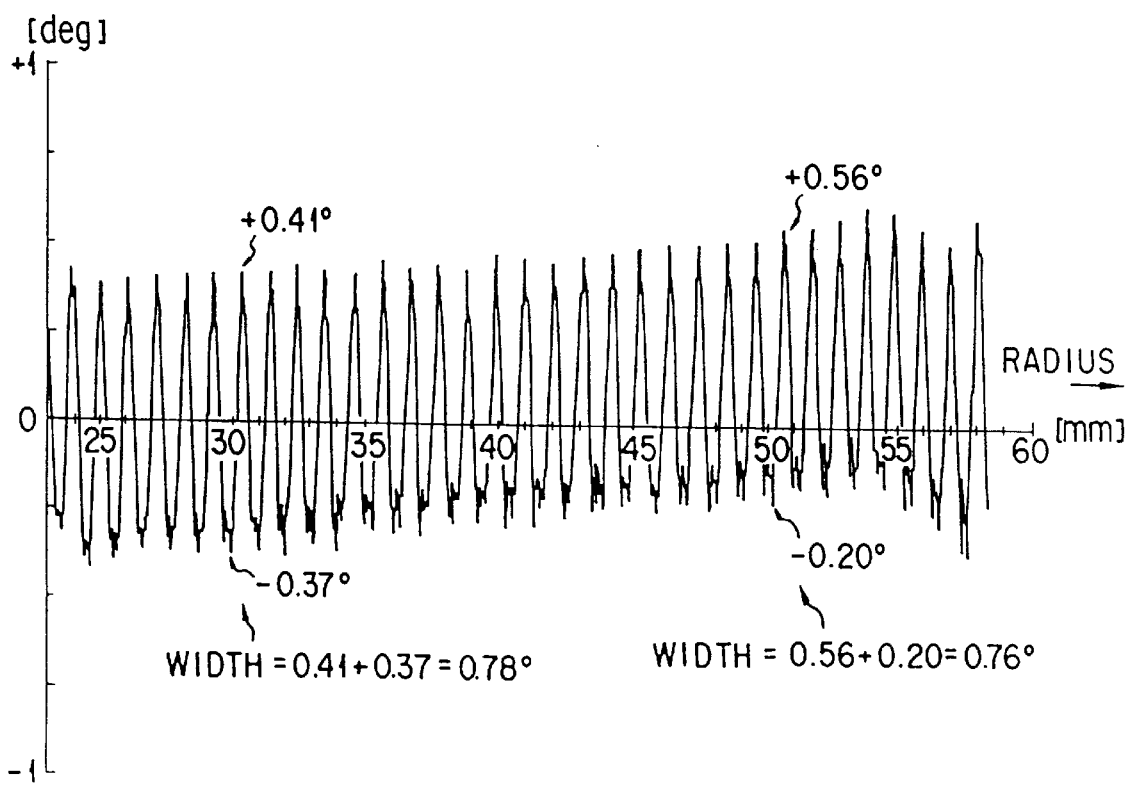
FIG. 17 is a graph showing measured tilt values for explaining the advantages of the invention.

FIG. 15 is a table showing comparison results of tilts between the case (inner surface printing) where a label (thickness: 50 μm; area: 3 mm$^2$) is printed on about half the entire circumference of the clamp area, as in the present invention, and the conventional case (outer surface printing). FIGS. 16 and 17 are graphs in which variations in tilt are plotted from 22 mm in radius to 58 mm in radius of a spiral (a measuring device is radially moved while the disk is being rotated). FIG. 16 shows the case of a disk of inner surface printing, and FIG. 17 shows the case of an outer surface printing. In FIG. 15, "r" indicates the radial position on the disk, and "range" is a variation range of tilt in one rotation of the disk, as measured at 30 mm in radius and at 50 mm in radius.

As can be seen from the table and graphs, the variation range is much smaller in the case of the inner surface printing, which is adopted in the present invention. The tilt of the disk hardly occurs, and the excellent signal reproduction can be performed in the case of using a high recording density disk.

As has been described above, according to the present invention, the indication buried inside the disk at the portion surrounding the central hole maintains a clear, stable indication state. In addition, the indication does not adversely affect the reference surfaces for clamping.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of manufacturing an optical disk comprising:
    forming light transmissive disk substrates having a common central hole and recording regions in radially intermediate regions, pits representing recording information being transferred onto said recording regions by means of a stamper, and forming a recess portion recessed in a thickness direction in a portion of at least one of the light transmissive disk substrates around said central hole;
    providing reflection films on those surfaces of the light transmissive disk substrates which are provided with said pits;
    providing protection films on upper surfaces of the reflection films;
    providing an indication member by one of printing and attachment on a bottom surface of said recess portion in at least one of the light transmissive disk substrates, which are provided with said protection films; and
    pressing, when attaching first and second optical disks having the indication member to each other as one body by means of an adhesive such that the reflection films are opposed to each other, outer sides of the first and second optical disks such that those portions of the first and second optical disks which face the indication member are more lightly pressed than other portions of the first and second optical disks.

2. The method according to claim 1, wherein said forming of said light transmissive disk substrates includes forming an annular projection serving as a spacer on a portion of an outer surface corresponding to said indication member.

3. The method according to claim 1, wherein said forming of said light transmissive disk substrates includes forming an annular projection serving both as a spacer and a lens portion on a portion of an outer surface corresponding to said indication member.

4. An apparatus for manufacturing an optical disk, said optical disk including first and second optical disks having annular light transmissive disk substrates having a common central hole, recording regions in radially intermediate regions, pits representing recording information on said recording regions, reflection films provided on those surfaces of the light transmissive disk substrates which are provided with said pits, and an indication member provided by one of printing and attachment on at least one of those sides of the light transmissive disk substrates which are provided with said reflection films and on a portion around said central hole, said manufacturing apparatus comprising:
    a stamper which forms said pits in said recording region; and
    an attaching apparatus having first and second pressing plates for attaching the first and second optical disks having the indication means to each other as one body by means of an adhesive such that the reflection films are opposed to each other, said attaching apparatus including disk-shaped elastic members provided on mutually facing sides of said first and second pressing plates for pressing outer surfaces of said first and second optical disks, those portions of the elastic members which face the indication members being formed of a material softer than a material of the other portions of the elastic members.

5. An apparatus for manufacturing an optical disk, said optical disk including first and second optical disks having annular light transmissive disk substrates having a common central hole, recording regions in radially intermediate regions, pits representing recording information on said recording regions, reflection films provided on those surfaces of the light transmissive disk substrates which are provided with said pits, and an indication member provided by one of printing and attachment on at least one of those sides of the light transmissive disk substrates which are provided with said reflection films and on a portion around said central hole, said manufacturing apparatus comprising:

a stamper which forms said pits in said recording region; and an attaching apparatus having first and second pressing plates for attaching the first and second optical disks having the indication means to each other as one body by means of an adhesive such that the reflection films are opposed to each other, said attaching apparatus including first and second annular recess portions formed in parts of mutually opposed surfaces of said first and second pressing plates for pressing outer surfaces of said first and second optical disks, which parts of the mutually opposed surfaces correspond to said indication members, and first and second elastic sheets situated along said mutually opposed surfaces of the first and second pressing plates so as to cover said first and second annular recess portions, said first and second optical disks being clamped between said first and second elastic sheets and attached to each other.

* * * * *